2,913,420
CORROSION INHIBITION OF BRINE

Edwin N. Alderman, Jr., and Caleb M. Stout, Tulsa, Okla., assignors to The Dow Chemical Company, Midland, Mich., a corporation of Delaware No Drawing. Application October 18, 1956
Serial No. 616,646

7 Claims. (Cl. 252—389)

This invention relates to the corrosion inhibition of corrosive aqueous saline solutions, hereinafter called "brines," toward ferrous metals. More particularly, it relates to the corrosion inhibition of calcium chloride brines toward ferrous metals by the addition of a synergistic corrosion inhibiting combination of a water-soluble chromate and a non-ionic surfactant, and to compositions suitable therefor.

The use of chromates and dichromates, usually in combination with various additaments, to passivate ferrous metal surfaces is well-known, and combinations of varying degrees of effectiveness have been announced.

In accordance with this invention, it has now been discovered that the harmful effects of corrosive brines of the type including alkali metal and alkaline earth metal salts of inorganic acids toward ferrous metals can be substantially reduced by adding to the corrosive brine having, or adjusted to have, a pH of at least 2, between 0.5 and 42 pounds, preferably between 10 and 20 pounds, of a water-soluble chromate and between 1 and 100 pounds, preferably between 10 and 50 pounds of a non-ionic surfactant per 1000 gallons of brine. The term "water-soluble chromate" includes alkali metal, ammonium, and alkaline earth metal chromates having sufficient solubility in a corrosive brine to give a concentration within the range indicated above, whether added as chromate or prepared in situ by mixing a dichromate and a base. The term "on-ionic surfactant" includes conventional surfactants prepared by condensing such hydrophobes as fatty acids, fatty amides, fatty alcohols, alkylphenols, rosins, and fatty mercaptans with such hydrophiles as ethylene oxide, sorbitan and ethanolamine. The corrosion inhibiting effects of this invention are operable at pHs of 2 and higher, preferably between 4 and 10, and, when necessary, the brine pH is adjusted to lie within such range, advantageously by adding a base such as sodium hydroxide or a mineral acid such as hydrochloric acid, as circumstances require.

The synergistic corrosion inhibiting effect of a combination of a water-soluble chromate with a non-ionic surfactant in inhibiting corrosion of ferrous metals when added to corrosive brines was most unexpected. One would have expected an average effect, at best, rather than a considerable improvement over the addition of either a water-soluble chromate or a non-ionic surfactant when both were added, within the concentration ranges previously indicated, to a corrosive brine. The synergistic chromate-non-ionic surfactant combination was found to be effective both at acid and alkaline pHs.

In use, a water-soluble chromate and a non-ionic surfactant are dissolved in a brine which corrodes ferrous metals in amounts sufficient to give a concentration between 0.5 and 42 pounds of chromate and between 1 and 100 pounds of non-ionic surfactant per 1000 gallons of corrosive brine.

The following table represents preferred embodiments of this invention in comparison with blanks.

TABLE I

Brine corrosion inhibition on AISI [1]–1020 mild steel by sodium chromate and surfactant [2]

Temperature: 80° F.
Corrosive media: 10 percent by weight aqueous $CaCl_2$ brines
Time: 3 weeks

| Test | $Na_2CrO_4$, lbs./1,000 gal. | Concentration of Surfactant, gallons/ 1,000 gal. | pH | Corrosion rate (lbs./ ft.²/day)× $10^3$ |
|---|---|---|---|---|
| 1 blank | 0 | 0 | 8.8 | 0.144 |
| 2 blank | 0 | 2 | 8.8 | 0.157 |
| 3 blank | 16 | 0 | 8.8 | 0.177 |
| 4 | 16 | 2 | 8.8 | 0.007 |
| 5 | 5 | 2 | 8.8 | 0.014 |
| 6 | 5 | 2 | [3] 6.5 | 0.090 |
| 7 blank | 0 | 2 | [3] 6.5 | 0.164 |
| 8 blank | 0 | 0 | [3] 6.5 | 0.212 |

[1] American Iron and Steel Institute.
[2] Di-secondary butylphenol condensation product with 10 moles of ethylene oxide.
[3] pH adjusted by adding hydrochloric acid.

Corrosion rate was determined by immersing metal coupons 2.75" by 1" by 0.125" of acid-pickled mild steel (AISI–1020) in 400 mls. of the test brine contained in one pint wide-mouthed bottles.

The following table shows the effect of chromate concentration on rate of corrosion of brines. Tests were run as previously described.

TALE II

Effect of inhibitor concentration on corrosion of AISI–1020 mild steel

Temperature: 80° F.
Time: 3 weeks
Corrosive media: 10 percent brines ($CaCl_2$), pH 8.8
Surfactant: 0.2 percent alkylphenol-ethylene oxide condensate

| Test | Concentration of $Na_2CrO_4$, lbs./1,000 gallons | Corrosion rate, (lbs./ft.²/ day)× $10^3$ |
|---|---|---|
| 1 blank | 0 | 0.1570 |
| 2 | 0.5 | 0.0858 |
| 3 | 3.0 | 0.0374 |
| 4 | 5.3 | 0.0098 |
| 5 | 10.6 | 0.0094 |
| 6 | 16 | 0.0090 |
| 7 | 21 | 0.0054 |
| 8 | 42 | 0.0053 |

The following table shows the effect of surfactant concentration at various temperatures on rate of corrosion of brine solution.

TABLE III

Corrosion rates of brine on AISI–1020 mild steel

Corrosive media: 10 percent $CaCl_2$ (pH 7.0), with 16 lbs. of $Na_2CrO_4$/1000 gallons
Time: 3 weeks
pH: 7, adjusted by adding hydrochloric acid

| Test | Temperature | Surfactant Concentration in gallons/1,000 gallons | Corrosion rate (lbs./ ft.²/day) × $10^3$ |
|---|---|---|---|
| 1 | 150 | 5.0 alkylphenol-ethylene oxide condensate | 0.009 |
| 2 | 150 | 2.0 alkylphenol-ethylene oxide condensate | 0.011 |
| 3 | 150 | 0.2 alkylphenol-ethylene oxide condensate | 0.022 |
| 4 | 80 | 5.0 alkylphenol-ethylene oxide condensate | 0.029 |
| 5 | 80 | 2.0 alkylphenol-ethylene oxide condensate | 0.023 |
| 6 | 80 | 0.2 alkylphenol-ethylene oxide condensate | 0.032 |
| 7 | 30 | 5.0 alkylphenol-ethylene oxide condensate | 0.023 |
| 8 | 30 | 2.0 alkylphenol-ethylene oxide condensate | 0.025 |
| 9 | 30 | 0.2 alkylphenol-ethylene oxide condensate | 0.042 |
| 10 | 80 | 2.0 rosin amine-ethylene oxide condensate | 0.020 |
| 11 | 80 | 2.0 polyoxyethylated polypropylene glycol | 0.059 |

The following table shows the beneficial results obtained with sodium chloride, sodium sulfate and magnesium chloride brines.

TABLE IV
*Corrosion rates of brines on AISI–1020 mild steel*

Temperature: 80° F.
Time: 3 weeks

| Test | Brine Solution [1] | Inhibitor | | Corrosion rate (lbs./ft.$^2$/day)× $10^3$ |
|---|---|---|---|---|
| | | Na$_2$CrO$_4$, lbs./1,000 Gallons | Surfactant [2] Gallons/1,000 Gallons | |
| 1 blank | 10 percent NaCl | 0 | 0 | 0.3430 |
| 2 blank | do | 16 | 0 | 0.2279 |
| 3 blank | do | 0 | 2 | 0.2755 |
| 4 | do | 16 | 2 | 0.1377 |
| 5 blank | 10 percent Na$_2$SO$_4$ | 0 | 0 | 0.2788 |
| 6 blank | do | 16 | 0 | 0.3420 |
| 7 blank | do | 0 | 2 | 0.2040 |
| 8 | do | 16 | 2 | 0.1872 |
| 9 blank | 10 percent MgCl$_2$ | 0 | 0 | 0.3249 |
| 10 blank | do | 16 | 0 | 0.2128 |
| 11 blank | do | 0 | 2 | 0.2279 |
| 12 | do | 16 | 2 | 0.0881 |

[1] Brine solution pHs were natural: for NaCl, 7.3; for Na$_2$SO$_4$, 7.2; for MgCl$_2$, 7.0.
[2] Polyoxyethylated polypropylene glycol.

The following table shows the effect of pH on corrosion inhibition.

TABLE V
*Effect of pH on brine corrosion inhibition by sodium chromate and surfactant* [1]

Temperature: 80° F.
Time: 3 weeks
Corrosive media: 10 percent CaCl$_2$ (aqueous)
Inhibitor:
 16 lbs. Na$_2$CrO$_4$
 and                 } 1000 gals.
 2 gallons surfactant

| Test | pH of Solution | Corrosion Rate (lbs./ft.$^2$/day)× $10^3$ |
|---|---|---|
| 1 | 2 | 0.151 |
| 2 | 2 (blank—no inhibitor) | 0.278 |
| 3 | 3 | 0.083 |
| 4 | 3 (blank) | 0.267 |
| 5 | 4 | 0.043 |
| 6 | 4 (blank) | 0.270 |
| 7 | 5 | 0.037 |
| 8 | 5 (blank) | 0.280 |
| 9 | 6 | 0.034 |
| 10 | 6 (blank) | 0.240 |
| 11 | 7 | 0.016 |
| 12 | 7 (blank) | 0.192 |
| 13 | 8 | 0.009 |
| 14 | 8 (blank) | 0.148 |
| 15 | 9 | 0.009 |
| 16 | 9 (blank) | 0.143 |
| 17 | 10 | 0.005 |
| 18 | 10 (blank) | 0.148 |

[1] Di-secondary butylphenol condensation product with 10 moles of ethylene oxide.

What is claimed is:

1. A brine having about 10 percent by weight of brine salt and a pH of at least 2 normally corrosive of ferrous metals containing as a corrosion inhibiting combination between 0.5 and 42 pounds of a water-soluble chromate and between 1 and 100 pounds of a non-ionic surfactant per 1000 gallons of brine.

2. A brine having about 10 percent by weight of calcium chloride and a pH of at least 2 containing as a corrosion inhibiting combination between 0.5 and 42 pounds of sodium chromate and between 10 and 50 pounds of a polyoxyethylated alkylphenol surfactant per 1000 gallons of brine.

3. A brine having about 10 percent by weight of sodium chloride and a pH of at least 2 containing as a corrosion inhibiting combination between 0.5 and 42 pounds of sodium chromate and between 10 and 50 pounds of a polyoxyethylated alkylphenol surfactant per 1000 gallons of brine.

4. A brine having about 10 percent by weight of sodium sulfate and a pH of at least 2 containing as a corrosion inhibiting combination between 0.5 and 42 pounds of sodium chromate and between 10 and 50 pounds of a polyoxyethylated alkylphenol surfactant per 1000 gallons of brine.

5. A brine having about 10 percent by weight of magnesium chloride and a pH of at least 2 containing as a corrosion inhibiting combination between 0.5 and 42 pounds of sodium chromate and between 10 and 50 pounds of a polyoxyethylated alkylphenol surfactant per 1000 gallons of brine.

6. A process for inhibiting the corrosion of a brine having a pH of at least 2 and normally corrosive of ferrous metals, which comprise adding thereto between 0.5 and 42 pounds of a water-soluble chromate and between 1 and 100 pounds of a non-ionic surfactant per 1000 gallons of brine.

7. A process for inhibiting the corrosion of a brine having about 10 percent by weight of an inorganic salt of the group consisting of alkali metals and alkaline earth metals and a pH of at least 2 and normally corrosive of ferrous metals which comprises adding thereto between 0.5 and 42 pounds of sodium chromate and between 10 and 50 pounds of a polyoxyethylated alkylphenol surfactant per 1000 gallons of brine.

References Cited in the file of this patent
UNITED STATES PATENTS

| | | |
|---|---|---|
| 1,873,084 | Walker | Aug. 23, 1932 |
| 1,925,672 | Oeding | Sept. 5, 1933 |
| 2,614,992 | Mankowich | Oct. 21, 1952 |
| 2,649,415 | Sundberg et al. | Aug. 18, 1953 |

OTHER REFERENCES

"Corrosion—Causes and Prevention," Speller, McGraw-Hill Pub. Co., N.Y., 1951, pp. 396–398.